United States Patent [19]
Strien et al.

[11] 3,749,443
[45] July 31, 1973

[54] MECHANISM FOR ADJUSTING AND LOCKING THE BACK REST OF A SEAT

[75] Inventors: Werner Strien, Stuttgart-Heumaden; Eberhard Faust, Stuttgart-Degerloch; Jurgen Walz, Stuttgart-N, all of Germany

[73] Assignee: Keiper, Fritz KG, Stuttgart, Germany

[22] Filed: June 28, 1971

[21] Appl. No.: 157,532

[30] Foreign Application Priority Data
July 2, 1970 Germany.................. P 20 32 833.0

[52] U.S. Cl. .................................. 297/362, 74/405
[51] Int. Cl. .............................................. A47c 1/025
[58] Field of Search.................... 297/361, 362, 355; 248/422, 424, 429; 5/79 B, 68; 74/405, 424.8 A

[56] References Cited
UNITED STATES PATENTS

| | | |
|---|---|---|
| 547,607 | 10/1895 | Gove .................................. 5/79 B |
| 1,968,970 | 8/1934 | Steele ................................. 5/79 B |
| 2,819,474 | 1/1958 | Olsen ..................................... 5/68 |
| 3,076,629 | 2/1963 | Biabaud ............................. 248/424 |
| 3,226,158 | 12/1965 | Strien ................................ 297/361 |
| 3,278,952 | 10/1966 | Holm ...................................... 5/68 |
| 3,627,253 | 12/1971 | Germain ............................ 248/429 |

*Primary Examiner*—Francis K. Zugel
*Attorney*—Arthur O. Klein

[57] ABSTRACT

A mechanism for effecting coarse as well as fine adjustments of the inclination of the back rest of a seat and for locking and bracing the back rest on both sides in the adjusted position by the manipulation of a single hand wheel, whereby any forces which might be exerted upon one side of the back rest will be uniformly taken up by both sides and will also be uniformly transmitted to both sides of the seat frame without causing any permanent distortions of the back rest or seat frame.

9 Claims, 8 Drawing Figures

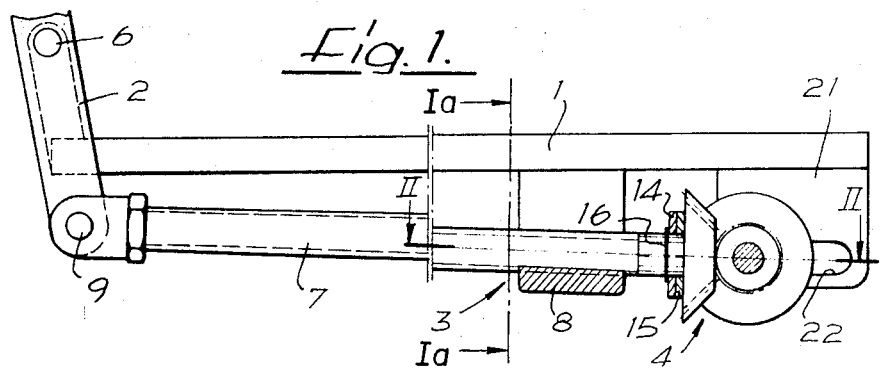
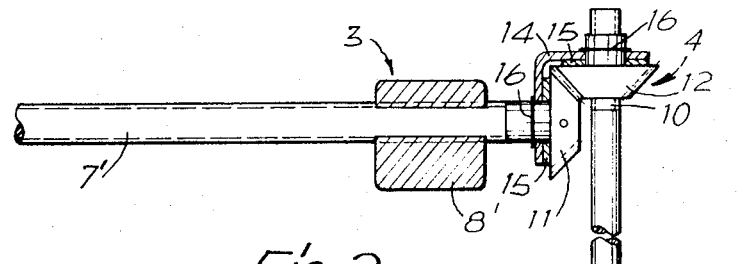
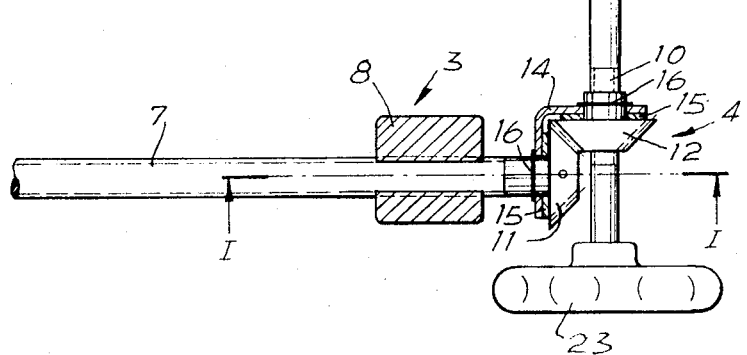

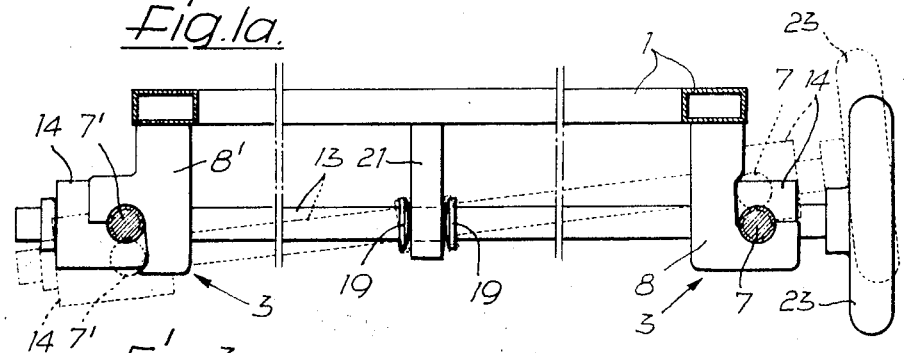
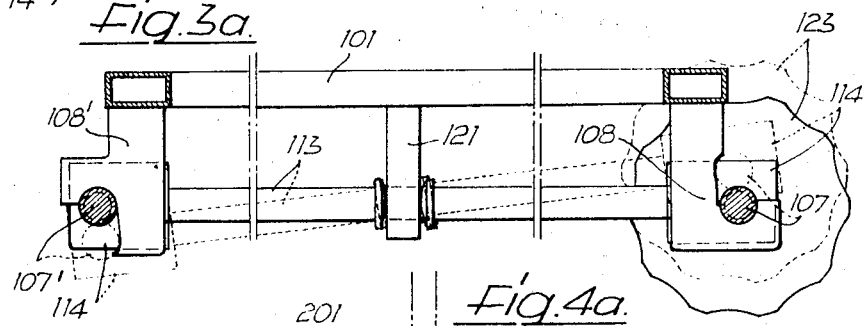
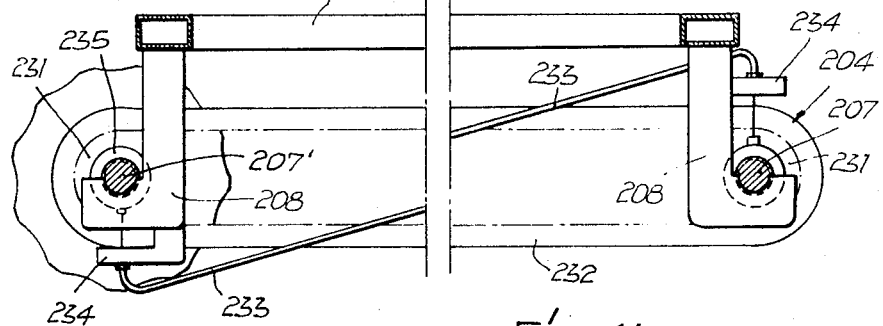
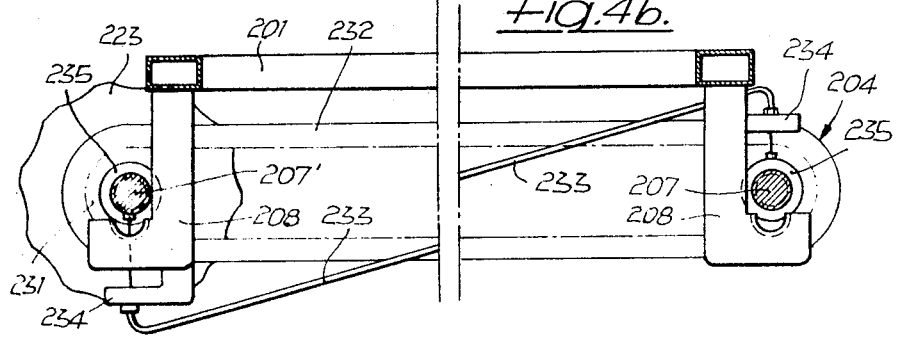

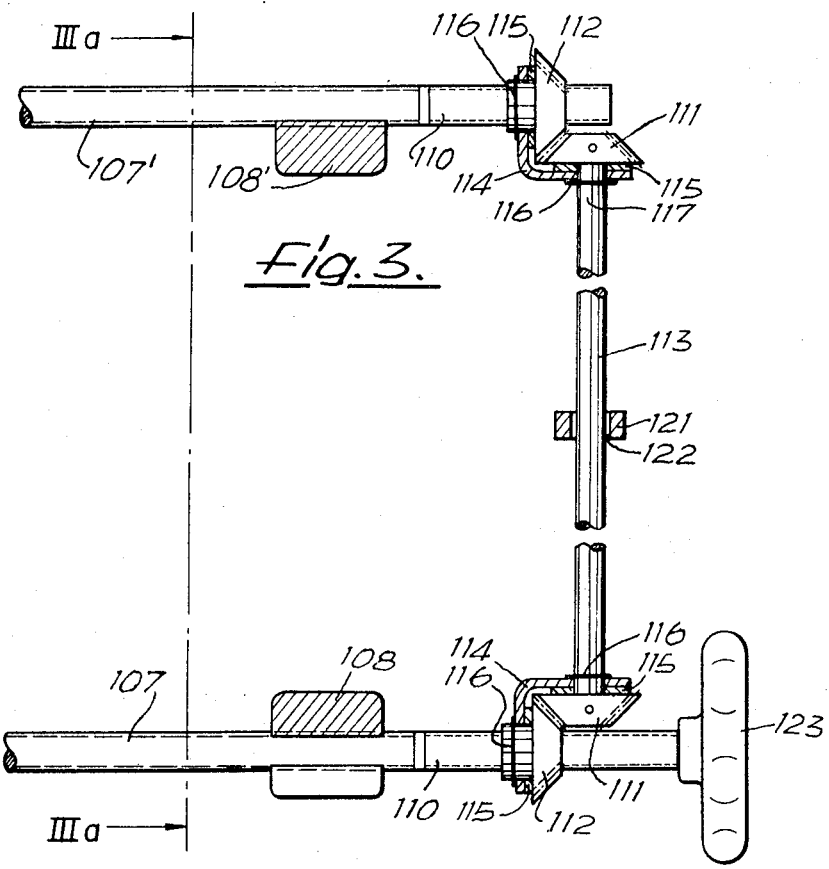
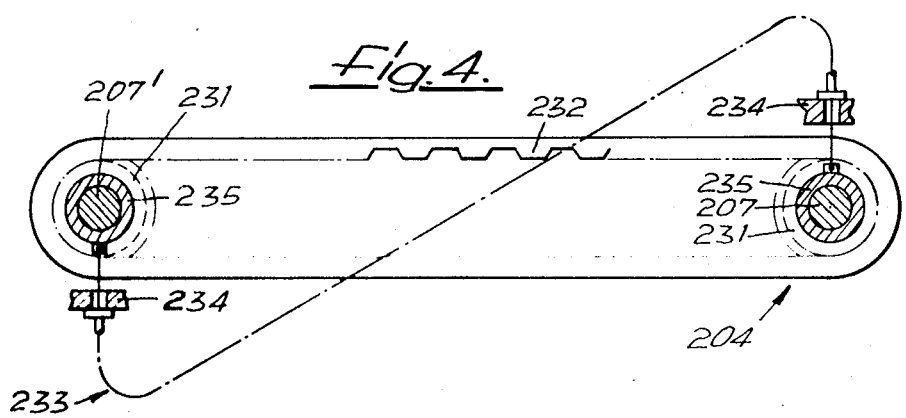

MECHANISM FOR ADJUSTING AND LOCKING THE BACK REST OF A SEAT

The present invention relates to an adjusting mechanism for varying the position of one or both seat elements of a motor vehicle relative to the floor of the vehicle and for locking the respective element in the adjusted position. These seat elements consist of the frame of a seat which is adjustable to different positions in the longitudinal direction of the vehicle floor and of the back rest of the seat which is pivotably mounted on the seat frame and adjustable to different inclinations relative to the seat frame and the seat cushion thereon. Although the present invention may be applied for adjusting either or both of these seat elements, it is primarily concerned with, and will hereafter be described with reference to an adjusting mechanism for the pivotable back rest of such a seat.

Usually, the frame of each front seat of a car or similar vehicle is mounted on a pair of rails on the bottom of the car and is adapted to be adjusted to and locked in different positions in the longitudinal direction of the car floor. The back rest of such a seat is usually pivotably mounted on the seat frame and adjustable to different inclinations relative to the seat by means of a single spindle which is connected to the seat frame and the back rest at only one lateral side thereof. Consequently, when the back rest is being adjusted to a different inclination, a force is exerted only upon one lateral side of the back rest which causes a resilient distortion of the back rest. This distortion occurs, however, only temporarily during the adjustment and thereafter the back rest will again take up its proper position. However, when driving a car in traffic it occurs frequently that the driver has to apply the brakes very suddenly with the result that a passenger sitting on a rear seat will in a spontaneous reaction grip the back rest of a front seat to brace himself so as not to be propelled forwardly. Often he will do so at that side of the back rest which is not secured by the adjusting and locking device. In this case, a very strong force will be exerted upon this unsupported side of the back rest which may cause a permanent distortion of the back rest and will partly also be transmitted to the seat and may cause a distortion of the latter relative to the rails on the car floor with the result that the seat may no longer be properly adjustable to different positions in the longitudinal direction.

It is an object of the present invention to provide a mechanism for adjusting and locking the back rest of a seat which may be very easily manipulated with one hand, improves the safety and stability of the back rest, and practically prevents any possibility of a permanent distortion of the back rest and also a distortion of the seat which might be caused by the exertion of a strong pressure or impact against one side of the back rest, for example, by a back-seat passenger of a car trying to brace himself when the driver of the car suddenly applies the brakes.

For attaining this object, the invention provides an adjusting and locking device which is mounted on both sides of the seat frame and of the back rest and comprises a threaded spindle on each side of the seat and back rest, pivotable connecting and transmitting means between both spindles which insure that an adjustment of one spindle by a single hand wheel will be equally transmitted to and carried out also by the other spindle, and locking means for both spindles which permit both spindles to be held in locking engagement with threaded parts of these locking means and also permit both spindles to be turned equally when a fine adjustment of the inclination of the back rest is to be carried out and which, by a pivoting movement of the connecting means together with the spindles relative to the threaded parts, also permit both spindles to be simultaneously disengaged from these threaded parts when a coarse adjustment of the inclination of the back rest is to be carried out.

The new adjusting mechanism has the advantage that the back rest will be equally supported on both sides, that the forces which are exerted upon the back rest and through the back rest also upon the seat will be taken up on both sides of the seat and back rest by the solid seat frame or by another stationary support, for example, the car floor, and that, if a force is exerted only upon one side of the back rest, this force will also be taken up by the equally supported other side and will not result in any permanent distortion of the back rest or of the seat. An important feature of the invention is also the fact that any manipulation of one adjusting spindle automatically results in a corresponding adjustment of the other spindle and that all manipulations of the adjusting mechanism may be easily carried out by a single hand wheel or the like.

Another important feature of the invention is the fact that the same mechanism may be employed for carrying out fine adjustments of the inclination of the back rest by a common rotation of both spindles about their axes by a single hand wheel within partly threaded brackets which are mounted in a fixed position, and also for carrying out coarse adjustments of the inclination by pivoting a connecting or trasnmitting element between and together with the two spindles by a manipulation of the same hand wheel, whereby both spindles are disengaged from the threaded parts of the brackets, whereupon the inclination of the back rest may be varied, for example, by pivoting the latter by hand or by the occupant of the seat either pressing with his back against the back rest or by leaning more forwardly to the approximate position to which he wishes to adjust the back rest and by allowing a spring which is often provided on such seats to pivot the back rest forwardly to this position. Each of the mentioned brackets or the like may be provided, for example, with a substantially U-shaped slot the inner bottom part of which is provided with a thread section with which the respective spindle is normally held in meshing engagement by the action of a spring. One or both side walls of the slot above or below the threaded part may then serve as guide walls to guide the spindle during its upward or downward pivoting movements into or out of engagement with the thread sections. When held in meshing engagement with the thread sections of the brackets, the two spindles will either be locked so as to prevent any pivoting movements of the back rest or both spindles may be turned equally and simultaneously about their axes by the connecting and transmitting element so as to effect a fine adjustment of the inclination of the back rest. This connecting and transmitting element is preferably provided in the form of a gearing which is also pivotable about an axis which is disposed centrally of its length. Another important feature and advantage of the invention is the fact that the entire adjusting mechanism may be of a very simple and inexpensive construction and may be very easily manipulated with one hand.

The features and advantages of the present invention will become more clearly apparent from the following detailed description thereof which is to be read with reference to the accompanying drawings, in which FIG. 1 shows a side view of an adjusting mechanism according to a first embodiment of the invention, but partly borken away and partly shown in cross section which is taken along the line I — I OF FIG. 2;

FIG. 1a is a view in vertical transverse section through the adjusting mechanism, the view being taken along the line Ia—Ia of FIG. 1;

FIG. 2 shows a top view of the main part of the adjusting mechanism according to FIG. 1, partly in cross section which is taken along the line II — II of FIG. 1;

FIG. 3 shows a top view similar to that as shown in FIG. 2, but of an adjusting mechanism according to a second embodiment of the invention; while FIG. 3a is a view in vertical transverse section through the adjusting mechanism of the invention, the section being taken along the line IIIa—IIIa of FIG. 3;

FIG. 4 shows, partly in section, a front view of an adjusting mechanism according to a third embodiment of the invention;

FIG. 4a is a view similar to FIG. 4 but with the seat adjusted vertically into a first-upper position; and FIG. 4b is a view similar to FIG. 4a with the seat adjusted vertically into a lower terminal position.

Referring first to FIGS. 1 and 2 of the drawings, the adjusting mechanism according to the invention and the parts of the seat with which this mechanism is associated essentially comprise a seat frame 1, a back rest 2, an adjusting device 3 on each lateral side of the seat frame, a bevel gear unit 4 associated with each adjusting device 3, and a swiveling or pivoting device 5.

The back rest 2 is pivotably mounted on the seat frame 1 so as to be pivotable relative thereto about a horizontal axis 6 to various inclinations by means of the two adjusting devices 3 each of which comprises a respective threaded spindle 7, 7' and a substantially U-shaped bracket 8, 8' which is secured to the seat frame 1 and is provided with a lower or upper internal thread section and through which the respective spindle 7, 7' extends. Each spindle is rotatable within its bracket 8, 8' about its longitudinal axis and is also rotatably connected to a head on its rear end which, in turn, is pivotably connected at 9 to the lower end of back rest 2 at a certain distance from the pivot 6 of the latter. The axes of the two pivots 6 and 9 therefore extend parallel to each other. As clearly indicated especially in FIG. 1, bracket 8 has a substantially U-shaped cross section and its inner bottom part is provided with a thread section which has a maximum peripheral length of 180° and a pitch corresponding to that of the threads on spindles 7 and 7'. The inner side walls of bracket 8 above its threaded bottom part extend substantially vertically to the seat frame 1 and thus also parallel to each other and form guide walls which are in sliding engagement with the crests of the thread on spindle 7. The shape of the other bracket 8' is substantially reverse to that of bracket 8 insofar as its thread section is located above the spindle 7 and is therefore adapted to engage from above with the thread on spindle 7', while the parallel inner guide walls of bracket 8' extend downwardly from its thread sections and again substantially vertically to the seat frame 1. The lower ends of these guide walls may be either free or connected to each other. Therefore, when spindle 7 is pivoted downwardly and spindle 7' upwardly about the common axis of their pivots 9, their threads will engage with the lower or upper thread section of bracket 8 or 8', respectively, while when both spindles are pivoted in the reverse directions, their threads will disengage from the thread section of bracket 8 or 8', respectively, but both spindles will be guided in substantially vertical directions by the smooth parallel inner walls of both brackets. Suitable spring means, not shown, are further provided which act upon the spindles 7 and 7' so as normally to maintain the same in meshing engagement with the thread sections of brackets 8 and 8' or for pivoting both spindles about their pivots 9 back to such meshing engagement after they have been pivoted out of engagement with the thread sections.

For a coarse adjustment of the inclination of back rest 2, the two spindles 7 and 7' are pivoted in opposite directions to each other so as to disengage them from the thread sections of bracket 8 and 8', whereupon the back rest 2 may be pivoted about the axis 6 toward the rear, for example, by the person sitting on the seat on seat frame 1 pressing with his back against the back rest 2, while for pivoting the back rest 2 forwardly, suitable spring means, not shown, are provided in a conventional manner. When the back rest has thus been roughly adjusted to the desired angle, spindles 7 and 7' are pivoted by their spring means back into meshing engagement with the thread sections of brackets 8 and 8' so that the back rest will then be locked in its adjusted position. If after this coarse adjustment of the back rest, its inclination is to be finely adjusted, the two spindles 7 and 7' while in threaded engagement with brackets 8 and 8' are to be turned about their longitudinal axes, For disengaging both spindles simultaneously from the thread sections of brackets 8 and 8' for a coarse adjustment of the back rest and for also permitting both spindles to be turned equally and simultaneously in the same directions about their axes when they are in threaded engagement with brackets 8 and 8' so as to effect a fine adjustment of the inclination of the back rest 2, the swiveling or pivoting device 5 is provided which may be manipulated with one hand. This device 5 comprises a transverse spindle or shaft 13 which extends at righc angles to the axes of spindle 7 and 7' and is at all times connected to these spindles by two bevel gear units 4 and carries on one end a hand wheel 23. The two bevel gears 11 of these two sets or units 4 are rigidly secured to the front ends of spindles 7 and 7', while the two other bevel gears 12 which are located at the same sides of bevel gears 11 and are in constant meshing engagement with bevel gears 11, are slidable axially along shaft 13 but are nonrotatable relative thereto by spline connections 10. The two bevel gears 11 and 12 of each set are maintained in meshing engagement with each other by an L-shaped bracket 14, each arm of which is separated from the wider side of the respective gear 11 or 12 by a spacing washer 15 which has a smaller diameter than this wider side so as to reduce the friction which would occur between brackets 14 and gears 11 and 12 when the latter are turned. For maintaining the two bevel gears 11 and 12 of each set at all times in a position in which their teeth properly engage with each other without causing any excessive friction between them during their rotation, spindles 7 and 7' and the hubs of gears 12 are provided with annular grooves into which spring washers 16 are inserted which engage with the sides of the two arms of each bracket 14 opposite to the sides upon which the spacing washers 15 engage.

Aside from being rotatable about its axis by hand wheel 23 to effect a fine adjustment of the inclination of back rest 2, shaft 13 also forms a straight two-armed lever the two arms of which are pivotable within a substantially vertical plane for short distances in opposite directions about an axis which is located substantially centrally between the two gear units 4. By these pivoting movements of shaft 13 which may be effected by lifting or lowering the hand wheel 23, spindles 7 and 7' may either be disengaged from the thread sections of brackets 8 and 8' when a coarse adjustment of the back rest 2 is to be carried out or they may be engaged with these thread sections of brackets 8 and 8' for a subsequent fine adjustment of the back rest. An extremely simple construction for pivotably mounting the shaft 13 consists according to FIGS. 1 and 2 of a bracket 21 which is located substantially centrally between the bevel gears 12 and is secured to the lower side of the seat frame 1. This bracket 21 is provided with a slot-shaped hole 22 the longitudinal axis of which extends substantially parallel to the axes of spindles 7 and 7' when they are in the engaged position with the thread sections of brackets 8 and 8'. Shaft 13 extends through this hole 22 and has sufficient play therein so as to be pivotable within a vertical plane due to the fact that its diameter is slightly smaller than the width of this hole. For preventing the shaft from sliding in its axial direction within hole 22, it is provided with a pair of annular guide flanges 19 at both sides of bracket 21. Hole 22 is slot-shaped so as to permit shaft 13 to slide back or forth therein when the back rest is being adjusted to different inclinations by being pivoted about the axis 6. The limited slidability of bevel gears 12 along shaft 13 is necessary to compensate for the difference between the movement of shaft 13 and spindles 7 and 7', that is, the pivotability of shaft 13 about its central axis 21 and the resulting arcuate movement of bevel gears 12 as against the straight vertical moveability of spindles 7 and 7' together with bevel gears 11 which is due to the vertical guide walls of brackets 8 and 8'. Without this slidability of gears 12, spindles 7 and 7' when pivoted about the axes 9 might be clamped against the inner side walls of brackets 8 and 8' and in addition their threads might be damaged.

To recapitulate: If a person sitting on the seat on seat frame 1 wishes to readjust considerably the inclination of the back rest 2, he should first lift the hand wheel 23 with one hand, whereby shaft 13 will be pivoted about its pivot axis, i.e., the bracket 21, and both spindles 7 and 7' will be disengaged simultaneously and for the same distance from the thread sections of brackets 8 and 8'. He may then tilt the back rest 2 more toward the rear by pressing with his back against it or he may lean more forwardly from the previous position of the back rest and approximately to the inclination to which he wishes the back rest 2 to be adjusted, whereupon the latter will follow this movement under the action of its spring means (not shown) which normally tend to pivot the back rest forwardly. During this disengaging movement of spindles 7 and 7', one of them will be guided vertically upward and the other vertically downward by the smooth inner guide walls of brackets 8 and 8'. While the back rest 2 is being pivoted to different inclinations and will thereby shift spindles 7 and 7' longitudinally, shaft 13 will follow this movement by sliding along the slot-shaped hole 22 in bracket 22.

If the person sitting on the seat then releases his pull on hand wheel 23, spindles 7 and 7' will again engage with the thread sections of brackets 8 and 8' under the action of the springs (not shown) and will thereby lock the back rest 2 in the newly adjusted position. If he then wishes to adjust the back rest 2 more accurately in one pivoting direction or the other, he may turn the hand wheel 23 accordingly, whereby both gear units 4 and also both spindles 7 and 7' will be euqally turned and the latter will be shifted equally in their longitudinal directions and transmit this movement through the pivots 9 to the lower ends of back rest 2 which will thereby be pivoted about the axis 6.

FIG. 3 illustrates an adjusting mechanism according to a second embodiment of the invention. Since the form of construction and manner of operation of this mechanism are largely the same as those of the mechanism according to FIGS. 1 and 2, the parts shown in FIG. 3 which are equal or similar to the parts shown in FIGS. 1 and 2 are designated by the same reference numerals which, however, are increased by 100.

This adjusting mechanism differs principally from that according to FIGS. 1 and 2 by the fact that shaft 113 is mounted in bracket 12 in a circular bore with such a bearing clearance that it may be pivoted without, however, being slidable in a direction parallel to spindles 107 and 107'. The extent of the pivotability of shaft 113 is again determined by its bearing clearance in the bore in bracket 121 which is sufficient to permit spindles 107 and 107' to be disengaged from the upper or lower thread section in bracket 108, 108', respectively. Since shaft 113 is therefore not movable in the longitudinal direction of and together with spindles 107 and 107' when the back rest is pivoted to a different inclination either by a coarse or fine adjustment, bevel gears 112 are splined on the spindles by splines 110 so as to be nonrotatable thereon but slidable in their longitudinal directions. Since in this embodiment of the invention both bevel gears 111 are mounted on shaft 113 inwardly of spindles 107 and 107' and gears 112, hand wheel 123 is secured to one of the spindles, for example, to spindle 107 which for this purpose is made of a greater length than spindle 107'. Since bevel gears 111 are in this case rigidly secured to shaft 113 and this shaft is rigidly connected to spindles 107 and 107 by the brackets 114, the small pivoting movement of shaft 113 for engaging spindles 107 and 107' with the thread sections of brackets 108 and 108' is transmitted to the spindles. Therefore, the substantially vertical lateral guide surfaces of bracket 108 and 108' also have to have a slightly arcuate shape in accordance with this pivoting movement of shaft 113. However, since the spindles 7 and 7' are rigidly connected to each other by shaft 113 and brackets 114, they only need to be guided above or below the thread sections of brackets 108 and 108' by such slightly arcuate walls either on their outer sides or as indicated in FIG. 3, on their inner sides, i.e., on the sides facing each other, while the other side walls of each bracket may be omitted.

Of course, the rigid connection of the ends of the two spindles by shaft 113 and brackets 114 as shown in FIG. 3 may also be applied to the adjusting mechanism according to FIGS. 1 and 2 if, for example, the inner guide walls of brackets 8 and 8' above or below the thread sections are made of an arcuate shape. In this event, the two bevel gears 11 and 12 of each set may be identical and both of them may be rigidly secured to the spindles 7, 7' and to shaft 13. The hand wheel 23 may then also be secured either to an extension of one of the spindles or to shaft 13, as shown.

In FIG. 4 which illustrates a third embodiment of the invention, those parts which are similar or functionally similar to the parts as shown in FIGS. 1 and 2 or in FIG. 3 are indicated by the same numerals which, however, are increased by 200 or 100, respectively. Therefore, a particular description of these parts will be unnecessary. The adjusting devices on both sides of the seat of the mechanism according to FIG. 4 are largely equal to those of the embodiment of the invention as shown in FIGS. 1 and 2, and the modification consists primarily in the fact that the two thread sections of brackets 8 and 8' are not located at the opposite sides of the brackets but at the same side since in this case both spindles are pivoted in the same directions.

The gearing 204 consists in this case of an endless chain or toothed belt 232 which passes around, and engages with the teeth of a pair of chain or sprocket wheels 231 which are secured to the front end of two spindles 207. The two spindles 207 are guided by the opposite guide surfaces at the same side of the thread sections of both brackets which are otherwise like the brackets 8 and 8' as shown in FIGS. 1 and 2 and also extend substantially vertically and parallel to each other. One of the two spindles 207 has an extension on which the hand wheel is secured by means of which a fine adjustment of the inclination of the back rest may be carried out.

For pivoting the two spindles 207 into and out of engagement with the thread sections of brackets 8 and 8' which, as previously mentioned are located on the same side of both brackets, the two spindles are connected by a Bowden cable 233. The opposite ends of the sheath of this cable are secured to parts 234 of the seat frame which are disposed in positions vertical to spindles 207 and at opposite sides of the latter so as to effect a pivoting movement of both spindles in the same direction. Each end of the core of the Bowden cable is rigidly secured to a bushing 235 in which the respective spindle 207 is slidable in its longitudinal direction and in which it is also rotatable.

In place of a Bowden cable it is also possible to provide the pivoting device in the form of a rigid connecting rod or the like the opposite ends of which are secured to the two bushings 235 and which is pivotably mounted substantially at the center between the two spindles 207 so as to be pivotable about an axis which extends substantially parallel to spindles 207. This pivot point of the connecting rod may either be slidable in the longitudinal direction of the seat similarly as the pivot point of shaft 113 as shown in FIGS. 1 and 2 or it may be in a fixed position similarly as the pivot point of shaft 113 as shown in FIG. 3. Since the length of the chain or toothed belt 232 is not variable, the surfaces of the partly threaded brackets for guiding the two spindles 207 must be made of a slightly arcuate shape similarly as described with reference to FIG. 3. Of course, this embodiment of the invention again requires the thread sections of brackets 108 and 108' to be disposed at the same side.

The illustrations of the pivot bearings 21 and 121 in FIGS. 1 and 2 and FIG. 3, respectively, are merely diagrammatic to indicate their functions. Actually, they may be as simple as shown or be of a more complicated construction.

As already indicated at the beginning, the mechanism according to the invention may be employed not only for adjusting the inclination of the back rest of a seat, but a similar although additional mechanism may also be employed for adjusting the entire seat to various positions in the longitudinal direction of the vehicle floor and for locking it in any of these positions. Instead of connecting the ends of the adjusting spindles to the back rest, as illustrated in FIG. 1, these ends would then have to be connected, for example, to the vehicle floor by universal joints or these ends of the spindles could also be connected by such joints to the seat frame, while the parts which in the embodiments as illustrated are secured to the seat frame could be secured, for example, to the vehicle floor.

Although our invention has been illustrated and described with reference to the preferred embodiments thereof, we wish to have it understood that it is in no way limited to the details of such embodiments but is capable of numerous modifications within the scope of the appended claims.

Having thus fully disclosed our invention, what we claim is:

1. An adjusting mechanism for varying the position of one of the elements of a seat of a motor vehicle, said seat elements comprising a seat frame which is adjustable to different positions in the longitudinal direction of the vehicle floor, and a back rest which is pivotably mounted on, and adjustable to different inclinations relative to said seat frame, said mechanism comprising a pair of locking members each having adjusting and locking serrations, a pair of rod-shaped members disposed underneath said seat frame and adjacent to the opposite lateral sides of one of said elements and having adjusting and locking serrations, pivot means for pivotably mounting an equal first end of each of said rod-shaped members so as to be pivotable about a substantially horizontal axis for interengaging said serrations of said pair of rod-shaped members at different parts of the length of said rod-shaped members with said serrations of said pair of locking members and for disengaging said serrations of said two pairs of members from each other to permit one of said pairs of members to be shifted in their longitudinal directions relative to the other pair of members, connecting means extending substantially transverse to said rod-shaped members near the second ends thereof and connecting said second ends to each other, means for guiding said transverse means together with said rod-shaped members during their pivoting movements about said substantially horizontal axis, and a single handle for engaging said two pairs of members with, and for disengaging them from each other and, when disengaged, for shifting them longitudinally relative to each other for subsequently engaging and locking them to each other in a different position of the length of said rod-shaped members.

2. An adjusting mechanism as defined in claim 1, in which said rod-shaped members consist of a pair of threaded spindles, said spindles aside from being pivotable at their first ends on said pivot means also being mounted so as to be rotatable about their loingitudinal axes, said serrations on each of said locking members forming a female thread section of a peripheral extent of no more than 180° and being adapted to mesh with the thread of one of said spindles when said spindle is pivoted toward said thread section, each of said locking members further having at least one smooth inner guide wall directly adjacent to and extending from one peripheral end of said thread section within a plane parallel to the plane of the pivoting movement of said spindle and substantially in sliding engagement with said spindle during the pivoting movement thereof, said connecting means comprising gear wheels mounted on said second ends of said spindles and associated gear means connecting both of said gear wheels and meshing therewith, said handle being adapted for pivoting said spindles together with said gears and gear means about said substantially horizontal axis for simultaneously engaging both of said spindles with, and for disengaging them from said thread sections and also for turning both of said spindles simultaneously about their longitudinal axes along said thread sections.

3. An adjusting mechanism as defined in claim 2, in which said gear means comprise a third spindle extending substantially transverse to said two threaded spindles, a bevel gear mounted on said third spindle near each end thereof, said gear wheels on said threaded spindles also forming bevel gears each of which is operatively associated with one of said bevel gears on said third spindle, connecting means for maintaining said associated bevel gears at all times in meshing engagement with each other, and pivot means for mounting said third spindle so that its opposite ends are pivotable in opposite directions to each other about an axis located substantially centrally between the two pairs of associated bevel gears so that, when the end of either of said three spindles carrying said handle and one of said bevel gears is pivoted by said handle in one direction within a substantially vertical plane about its own pivot means, both threaded spindles will be simultaneously disengaged from said thread sections of said locking members, whereupon said spindles may be shifted by said handle for equal distances in the longitudinal direction of said threaded spindles relative to said locking members for carrying out a coarse adjustment while when said spindle carrying said handle is pivoted in the other direction within said vertical plane, both threaded spindles will be simultaneously engaged with said thread sections, whereupon said handle may be turned about the axis of and with the spindle to which it is secured, whereby both threaded spindles will be equally turned to carry out a fine adjustment of said threaded spindles relative to said locking members.

4. An adjusting mechanism as defined in claim 2, in which said gear means consist of an endless flexible member wound around and connecting said gear wheels on said spindles and having teeth in constant meshing engagement with the teeth of said gear wheels.

5. An adjusting mechanism as defined in claim 2, further comprising a Bowden cable connecting the ends of said spindles carrying said wheels to each other for transmitting the pivoting movement of one of said spindles equally to the other spindle, said thread sections of both of said locking members being disposed at the same side of said spindles.

6. An adjusting mechanism as defined in claim 3, in which the threaded section of one of said locking members is disposed below the spindle extending through said member and the guide wall of said locking member extends substantially vertically upwards from one peripheral end of said threaded section.

7. An adjusting mechanism as defined in claim 6, in which said guide walls of said locking members have a slightly arcuate shape.

8. n adjusting mechanism as defined in claim 6, in which each locking member has a pair of parallel guide walls extending upwardly or downwardly from the opposite peripheral ends of the thread section of the respective locking member for guiding each spindle on both sides.

9. An adjusting mechanism as defined in claim 3, further comprising first pivot means having a substantially horizontal axis connecting said back rest to said seat frame to permit said back rest to be pivoted relative to said seat frame, said back rest having an extension normally projecting downwardly from said pivot means, second pivot means near the free end of said extension having an axis parallel to the axis of said first pivot means and pivotably connecting said first ends of said threaded spindles near both lateral sides of said back rest to said extension, means for also connecting said threaded spindles to said second pivot means so as to be rotatable about their longitudinal axes, a pair of brackets with said locking means thereon secured to and projecting downwardly from said seat frame near both lateral sides thereof, and a bracket conaining said pivot means of said third spindle secured to and projecting downwardly from said seat frame substantially at the center of its width.

* * * * *